US009262928B2

(12) United States Patent
Sampigethaya

(10) Patent No.: US 9,262,928 B2
(45) Date of Patent: Feb. 16, 2016

(54) PREDICTION OF FLIGHT PATH PRIVACY

(71) Applicant: The Boeing Company, Chicago, IL (US)

(72) Inventor: Radhakrishna G. Sampigethaya, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 14/044,721

(22) Filed: Oct. 2, 2013

(65) Prior Publication Data

US 2015/0228196 A1    Aug. 13, 2015

(51) Int. Cl.
G08G 5/04       (2006.01)
G08G 5/00       (2006.01)
B64D 43/00      (2006.01)

(52) U.S. Cl.
CPC ............. *G08G 5/0021* (2013.01); *B64D 43/00* (2013.01); *G08G 5/0008* (2013.01); *G08G 5/0013* (2013.01); *G08G 5/0034* (2013.01); *G08G 5/0078* (2013.01); *G08G 5/0082* (2013.01); *G08G 5/006* (2013.01)

(58) Field of Classification Search
None
See application file for complete search history.

(56) References Cited

U.S. PATENT DOCUMENTS

| | | | |
|---|---|---|---|
| 6,259,988 B1 | 7/2001 | Galkowski et al. | |
| 6,266,610 B1 | 7/2001 | Schultz et al. | |
| 6,850,497 B1* | 2/2005 | Sigler | H04B 7/1853 370/310 |
| 8,248,294 B2 | 8/2012 | Sampigethaya et al. | |
| 8,290,696 B1* | 10/2012 | Sridhar | G08G 5/045 701/1 |
| 8,712,744 B1* | 4/2014 | Sampigethaya | G08G 5/00 701/120 |
| 2005/0200501 A1* | 9/2005 | Smith | G01S 5/06 340/963 |
| 2007/0078572 A1* | 4/2007 | Deker | G08G 5/0013 701/3 |
| 2008/0036659 A1* | 2/2008 | Smith | G01S 13/765 342/454 |
| 2008/0288164 A1* | 11/2008 | Lewis | G08G 5/0034 701/120 |
| 2009/0125221 A1* | 5/2009 | Estkowski | G05D 1/104 701/120 |
| 2009/0150012 A1* | 6/2009 | Agam | G08G 5/0034 701/3 |

(Continued)

FOREIGN PATENT DOCUMENTS

EP       0524099 A1    1/1993

OTHER PUBLICATIONS

Block Display of Aircraft Situation Display to Industry (ASDI) Data; http://www.nbaa.org/ops/security/asdi/; National Business Aviation Association; copyright 2014; 3 pages.

(Continued)

*Primary Examiner* — Jonathan M Dager
(74) *Attorney, Agent, or Firm* — Baker & Hostetler LLP

(57) ABSTRACT

A method of predicting an achievable level of privacy of a flight path can include receiving an indication of a flight route of an aircraft, receiving an indication of one or more privacy enhancement techniques, estimating an air traffic density for one or more airspaces along or near the flight route where the estimating is based on information obtained from one or more aviation information databases, and estimating an achievable level of privacy of the flight path based, at least in part, on the air traffic density for one or more airspaces and the one or more privacy enhancement techniques. The method can further include using the estimated achievable level of privacy of the flight path as a privacy layer in one or more flight planning and optimization problems.

20 Claims, 8 Drawing Sheets

(56) References Cited

U.S. PATENT DOCUMENTS

| | | | | |
|---|---|---|---|---|
| 2009/0322589 A1* | 12/2009 | Dooley | G01S 13/765 | 342/37 |
| 2010/0094487 A1* | 4/2010 | Brinkman | G01C 25/00 | 701/14 |
| 2010/0198490 A1* | 8/2010 | Breen | G01S 5/0221 | 701/120 |
| 2010/0283635 A1* | 11/2010 | Brinkman | G01C 23/00 | 340/961 |
| 2010/0315281 A1* | 12/2010 | Askelson | G01S 7/003 | 342/30 |
| 2011/0057830 A1* | 3/2011 | Sampigethaya | G01S 5/0072 | 342/36 |
| 2011/0248878 A1* | 10/2011 | Sampigethaya | G08G 5/0013 | 342/36 |
| 2012/0150426 A1* | 6/2012 | Conway | G08G 5/0026 | 701/120 |
| 2012/0158280 A1* | 6/2012 | Ravenscroft | G01C 21/005 | 701/400 |
| 2012/0277986 A1* | 11/2012 | Judd | G08G 5/0013 | 701/122 |
| 2013/0080043 A1* | 3/2013 | Ballin | G08G 5/0034 | 701/120 |
| 2013/0231803 A1* | 9/2013 | Barraci | G01C 23/00 | 701/3 |
| 2014/0156109 A1* | 6/2014 | Estkowski | B64C 19/00 | 701/2 |
| 2014/0304801 A1* | 10/2014 | Kauffman | G08G 5/0013 | 726/11 |
| 2014/0327564 A1* | 11/2014 | Sampigethaya | H04L 9/3215 | 342/32 |

OTHER PUBLICATIONS

European Patent Application No. 14179326.5; Extended Search Report; dated Feb. 6, 2015; 7 pages.

* cited by examiner

PREDICTION OF FLIGHT PATH PRIVACY

BACKGROUND

The present application is generally related to prediction of opportunities to enhance privacy of an aircraft flight path.

Air transportation systems with e-enabled aircraft and networked technologies, such as Automated Dependent Surveillance Broadcast (ADS-B), are data communications systems developed to assist in reducing air traffic congestion and air traffic control inefficiencies by enabling exchange of precise aircraft surveillance data in shared airspaces. An e-enabled aircraft means an aircraft with advanced computing, sensing, control, and communications. An e-enabled aircraft is capable of communicating in a global information network, e.g., as a network node. ADS-B protocol requires each aircraft to periodically broadcast air traffic beacons, as frequent as one or two times per second. Each beacon from an aircraft contains an authentic digital identity of the aircraft as well as highly accurate surveillance data, e.g., position, altitude, velocity, time, intent, and other spatial data currently associated with the aircraft. Air traffic beacons can inform air traffic control tasks while ensuring liability or traceability of the associated aircraft in the shared networked airspace. These air traffic beacons are in plaintext and can be received by anyone located up to 100 miles or more from the source of ADS-B broadcasts. Thus traffic beacons from aircraft may be misused by unauthorized entities, e.g., an adversary, and used to obtain unique identifiers of communicating aircraft as well as track in real-time the positions of these uniquely identifiable aircraft and record all position trajectories of these aircraft.

In the airborne IP network, a major threat to flight privacy is from the location estimation of communicating aircraft based on their transmission radio signal properties as well as position data available from aircraft originating messages such as ADS-B beacons. Location tracking can invade aircraft operator privacy in unanticipated ways, since private aircraft may be used to visit places of political, business or personal interest. Location trajectories of a private aircraft, when correlated with other information databases such as geographic maps and business or political developments, can help in the identification of places visited by the aircraft as well as inference of travel intent of the user. Furthermore, location history of an aircraft over time can lead to profiling of the user's personal preferences and interests.

The default identifier in an ADS-B beacon from an aircraft may be, e.g., a permanent 24-bit address of the aircraft as defined by the ICAO (International Civil Aviation Organization). An aircraft in an uncontrolled airspace, operating under visual flight rules (VFR), or instrument flight rules (IFR) may use an anonymous identifier in ADS-B broadcast. An aircraft flight control system may compute a random identifier to generate a 24-bit anonymous identifier for an aircraft. The aircraft flight control system computes the anonymous identifier as a function of a random quantity, e.g., a location or a time of use of anonymous identifier, or a combination thereof, and the ICAO identifier. Air traffic controllers on the ground know the ICAO address of the aircraft and can verify ADS-B broadcasts from the aircraft, e.g., to establish liability in airspace for emergency events. Various methods of updating aircraft identifiers are described in U.S. Pat. No. 8,248,294, by Sampigethaya, et al.

Privacy-enhancing technologies which provide confidentiality, such as cryptographic encryption, can also mitigate privacy risks by controlling access to sensitive or personal data in aircraft messages. Such solutions require a cryptographic key to be shared between each aircraft and all the air traffic controllers on the ground.

SUMMARY

Illustrative examples of the present disclosure include, without limitation, methods, structures, and systems. In one aspect, a method of predicting an achievable level of privacy of a flight path can include receiving an indication of a flight route of an aircraft, receiving an indication of one or more privacy enhancement techniques, estimating an air traffic density for one or more airspaces along or near the flight route where the estimating is based on information obtained from one or more aviation information databases, and estimating an achievable level of privacy of the flight path based, at least in part, on the air traffic density for one or more airspaces and the one or more privacy enhancement techniques. The method can further include using the estimated achievable level of privacy of the flight path as a privacy layer in one or more flight planning and optimization problems.

In one example, the method can include receiving an indication of aircraft information of the aircraft, wherein estimating the achievable level of privacy of the flight path is further based, at least in part, on the aircraft information. The information obtained from the one or more aviation information databases can include air traffic information from an air traffic database. The information obtained from the one or more aviation information databases can include airspace system information from an airspace system database. The one or more privacy enhancement techniques can include a technique that includes updating an identifier of the aircraft. The technique can further include one or more of a random silent period, using a mix airspace, and a group update.

In another aspect, a system of predicting an achievable level of privacy of a flight path can include a user input module, a privacy computation module, and a user output module. The user input module can be configured to receive an indication of a flight route of an aircraft and an indication of one or more privacy enhancement techniques. The privacy computation module can be configured to estimate, based on information obtained from one or more aviation information databases and the information obtained from the user input module, an air traffic density for one or more airspaces along or near the flight route and to estimate an achievable level of privacy of the flight path based, at least in part, on the air traffic density for one or more airspaces and the one or more privacy enhancement techniques. The user output module can be configured to obtain input from the privacy computation module and output an indication of the estimated achievable level of privacy.

In one example, the privacy computation module can be configured to communicate with the one or more aviation information databases via a network. In another example, the system can be located on the aircraft. In another example, the system can be located in a ground-based station. The ground-based station can be configured to transmit an output of the user output module to the aircraft. The ground-based station can also be configured to transmit an updated aircraft identifier to the aircraft with the output of the user output module.

In another aspect, a method of predicting a flight privacy enhancement opportunity can include receiving an indication of a flight route of an aircraft, receiving an indication of one or more privacy enhancement techniques, estimating an air traffic density for one or more airspaces along or near the flight route, the estimating based on information obtained from one or more aviation information databases, estimating an achievable level of privacy of the flight path based, at least in part, on the air traffic density for one or more airspaces, and predicting a flight privacy enhancement opportunity based, at least in part, on the air traffic density, the estimated achievable level of privacy of the flight path, and the one or more privacy enhancement techniques.

In one example, the flight privacy enhancement opportunity can be located in one of the one or more airspaces. The one or more privacy enhancement techniques can include a technique that includes updating an identifier of the aircraft in the one of the one or more airspaces. In another example, predicting the flight privacy enhancement opportunity can include predicting a plurality of flight privacy enhancement opportunities located along or near the flight route. The method can further include displaying the flight route overlayed on a representation of a geographical area and displaying the one or more flight privacy enhancement opportunities overlayed on the representation of the geographical area Other features of the methods, structures, and systems are described below. The features, functions, and advantages can be achieved independently in various examples or may be combined in yet other examples, further details of which can be seen with reference to the following description and drawings.

BRIEF DESCRIPTION OF THE DRAWINGS

Throughout the drawings, reference numbers may be reused to indicate correspondence between referenced elements. The drawings are provided to illustrate examples described herein and are not intended to limit the scope of the disclosure.

DETAILED DESCRIPTION

Figure 1:
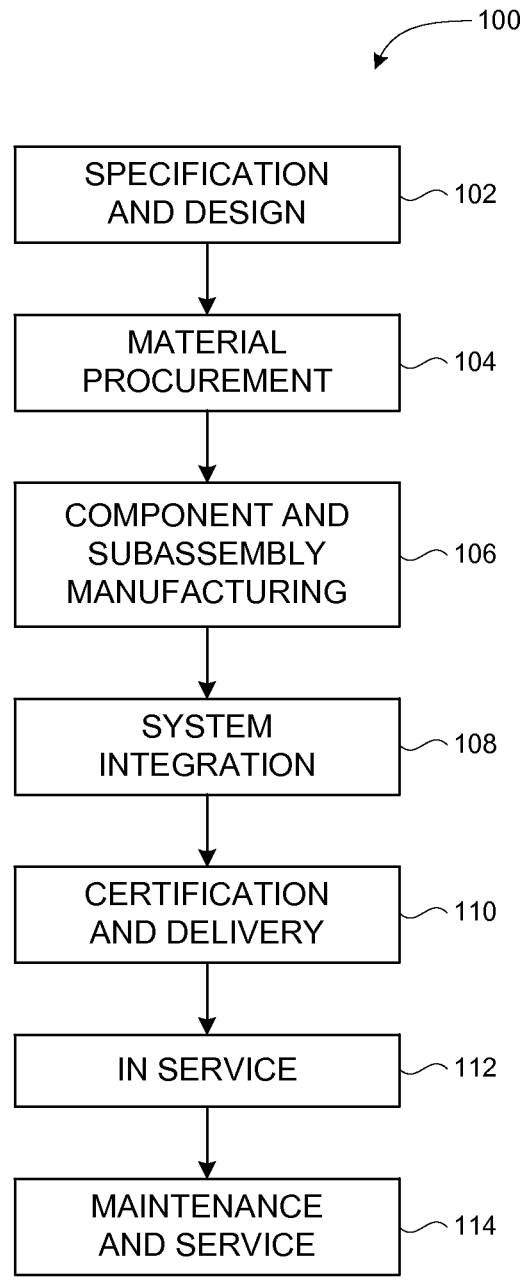
FIG. 1 depicts a flow diagram of an aircraft production and service methodology.
Figure 2:
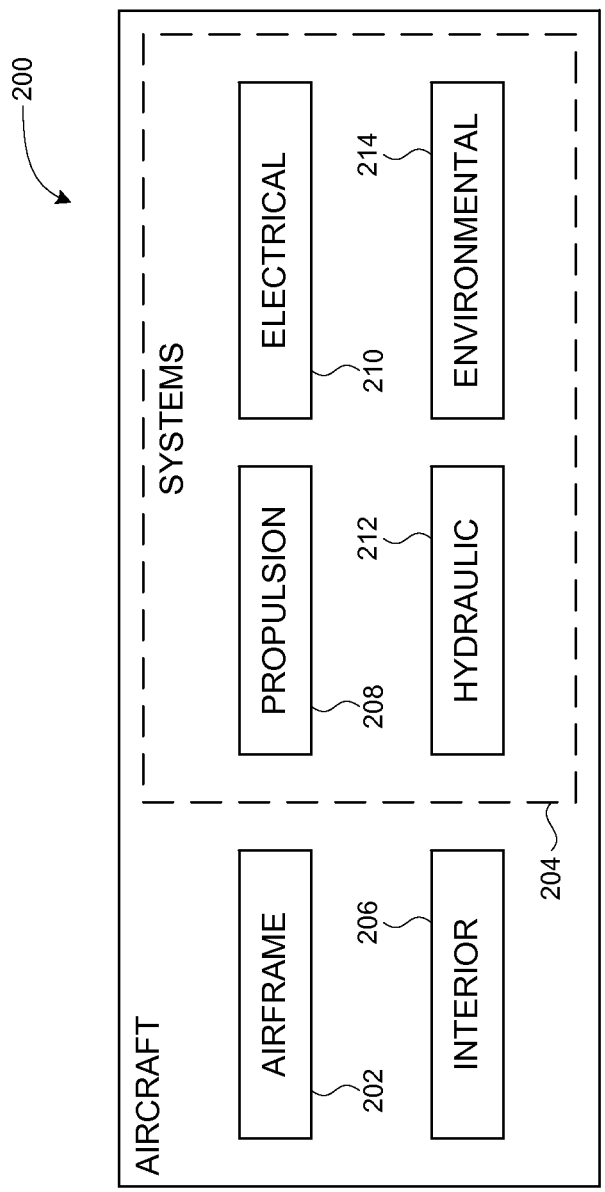
FIG. 2 depicts a block diagram of an aircraft.

Examples in this disclosure may be described in the context of aircraft manufacturing and service method 100 as shown in FIG. 1 and an aircraft 200 as shown in FIG. 2. During preproduction, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Users of non-commercial aircraft, including business jets, general aviation aircraft, unmanned aerial vehicles, military aircraft, space-bound vehicles, and the like, can be sensitive to public tracking of their flights. User privacy concerns range from personal safety to commercially sensitive operations (such as company mergers). Similarly, public aircraft, including government and military aviation aircraft and space craft, are sensitive to who can identify and track their movements in the airspace. Indeed, authorized entities are authorized to track aircraft in the particular airspaces for the purpose of airspace security and air traffic management. For example, the Federal Aviation Administration ("FAA") is authorized to track aircraft operating in the airspace of the United States. Such authorized entities typically require aircraft to broadcast at least an identifier of the aircraft and sometimes additional information, such as altitude, position (e.g., latitude and longitude), heading, and the like.

Information can be transmitted from aircraft in a variety of formats. Flight deck communications can be formatted according to Mode A/C/S format, Aircraft Communications Addressing and Reporting System ("ACARS") format, ADS-B format, controller-pilot voice communication format, controller-pilot data link communications ("CPDLC"), and the like. Internet Protocol (IP) network messages can be transmitted by a transmission system, such as L-band digital aeronautical communications system ("LDACS"), a passenger domain network link, such as a passenger domain network link provided by Gogo®. Transmissions of information—both information required to be transmitted by authorized agencies and information not required to be transmitted by authorized agencies—can be received by both authorized entities and unauthorized entities.

Several tools and websites are available that enable the public to access real-time or near-real-time information about the identities and flight tracks of aircraft in a particular airspace. For example, operators of radio receivers, such as amateur aviation enthusiasts, can receive information broadcast by aircraft. Those operators of radio receivers can provide the information they receive to a flight tracking network feeding a website that stores flight tracking information. When a particular number of radio receiver operators in a given area provide information from aircraft to a flight tracking network, the flight tracking network can generate flight tracking reports of aircraft in range of the given area based on the information provided from the radio receiver operators. Some flight tracking networks provide flight tracking reports online, such as by operating a website that provides flight tracking reports.

Some aircraft providers and passengers may desire to prevent unauthorized entities from tracking the flight path of a given aircraft. Private aircraft identity and flight tracks from primary and secondary radar infrastructure of the FAA are protected by the Block Aircraft Registration Request (BARR) process. The process enables an operator to file a BARR request and prevent the FAA or other service provider from publicly revealing an operator's aircraft identification and flight tracks. However, a BARR request may not provide a desired level of privacy for a particular aircraft or for a particular flight. For example, BARR requests protect only against privacy loss due to flight tracking based on primary radar surveillance. Although secondary radar surveillance using aircraft's Mode S transponder replies is considered to be covered by BARR, the Mode S transponder replies of the aircraft can be passively eavesdropped to obtain an approximate aircraft position and a permanent aircraft identity. Additionally, BARR currently does not cover the privacy threat from passive eavesdropping of ADS-B beacons.

Figure 3:
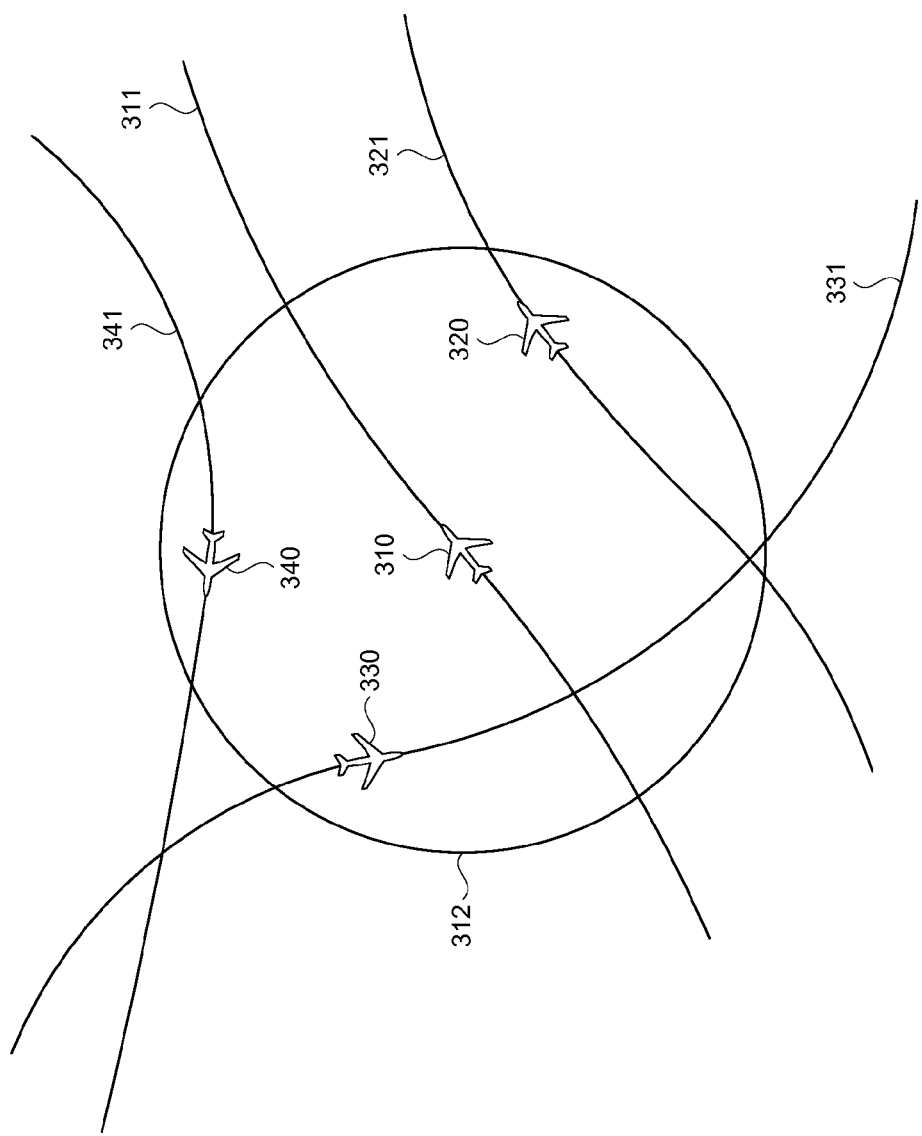
FIG. 3 depicts an example of several aircraft travelling on flight paths and the density of those several aircraft at a particular moment.

One or more flight privacy enhancement techniques can enable private aircraft operators to mitigate unauthorized tracking of the aircraft's air traffic control communications. Some privacy enhancement techniques can be explained with respect to the example of an airspace depicted in FIG. 3. FIG. 3 depicts a first aircraft 310 travelling on a flight path 311. An airspace 312 is depicted around the first aircraft 310. The airspace 312 can represent an approximate area accessible by radio communications transmitted by the first aircraft 310. FIG. 3 also depicts a second aircraft 320 travelling along flight path 321, a third aircraft 330 travelling along flight path 331, and a fourth aircraft 340 travelling along flight path 341. At the moment depicted in FIG. 3, the first aircraft 310, the second aircraft 320, the third aircraft 330, and the fourth aircraft 340 all happen to be located within the airspace 312.

One example of a flight privacy enhancement technique is an update of an identification of an aircraft from the aircraft's identifier to an updated identifier. For example, the first aircraft 310 can update its identifier at the time depicted in FIG. 3. The updated identifier may need to be an identifier authorized by an authorized entity, such as the FAA. The updated identifier may be an identifier that was pre-loaded onto the first aircraft 310 before the first aircraft 310 took off. The updated identifier may be an identifier that was transmitted to the first aircraft 310 during the flight from an authorized entity, such as the FAA, or a third party, such as an entity that supports aircraft with information during flight. The updated identifier may be a number generated from an algorithm approved by an authorized entity, such as the FAA, based on information such as the aircraft's original identifier, the time, the aircraft's position (e.g., longitude and/or latitude), and any other information. The update of the identifier may need to comply with regulations issued by an authorized entity. When the first aircraft 310 begins transmitting using the updated identifier, anyone that is tracking flights within airspace 312 may not immediately recognize that the updated identifier belongs to the first aircraft 310. A flight tracker may interpret the updated identifier as a new aircraft (e.g., a fifth aircraft) entering the airspace 312, as a possible identifier of the other aircraft within airspace 312 (e.g., second aircraft 320, the third aircraft 330, or the fourth aircraft 340), or as being related to any other number of reasons. If the flight tracker does not figure out that the updated identifier is associated with the first aircraft 310, then the first aircraft 310 may continue along flight path 311 without the flight tracker appreciating the true identity of the first aircraft 310.

Another flight privacy enhancement technique is an identifier update with a random silent period. This technique can include an update of an aircraft's identifier combined with a period of silent operation. For example, during the period that the first aircraft 310 is within airspace 312, the first aircraft 310 may not broadcast any identifier. Such "radio silence" may be permitted by authorized entities, such as the FAA, in particular airspaces and/or at specific times. While the first aircraft 310 is in airspace 312, the first aircraft 310 can update its identifier. Once the first aircraft 310 exits airspace 312 and resumes broadcasting its identifier, it can broadcast its updated identifier. Because of the time between the entry of the first aircraft 310 into airspace 312 and the exit of the first aircraft 310 from airspace 312, a flight tracker may not be able to determine that the updated identifier is associated with the first aircraft 310.

Another flight privacy enhancement technique is a mix airspace technique. In a mix airspace technique, particular aircraft entering a particular airspace update their identifier while in that particular airspace. For example, in a particular airspace, all non-commercial aircraft may update their identifiers. Using the depiction in FIG. 3, the first aircraft 310, the second aircraft 320, and the third aircraft 330 may be non-commercial aircraft (such as business jets), and the fourth aircraft 340 may be a commercial aircraft. Each of the non-commercial aircraft (i.e., the first aircraft 310, the second aircraft 320, and the third aircraft 330) may update their identifiers within airspace 312. By doing this, the non-commercial aircraft make it difficult for flight trackers to determine the updated identifiers of each of the non-commercial aircraft as they exit the airspace 312. The commercial aircraft (i.e., the fourth aircraft 340) may not update its identifier because authorized entities may not permit commercial aircraft to update their identifiers and because the movements of commercial aircraft are less likely to have privacy needs.

Another flight privacy enhancement technique is a group update technique. In a group update technique, two or more aircraft may update their identifiers during a particular time or while flying in a particular airspace. Using the depiction in FIG. 3, the first aircraft 310 and the second aircraft 320 may both update their identifiers in the airspace 312. Such action may confuse flight trackers as to which updated identifier belongs to the first aircraft 310 and which updated identifier belongs to the second aircraft 320.

While particular examples of flight privacy enhancement technique have been described herein, other type of flight privacy enhancement techniques can be used as well as modifications of the flight privacy enhancement techniques described herein. Further details about various flight privacy enhancement techniques—including descriptions of techniques that enable private aircraft avionics to mitigate unauthorized tracking of the aircraft's air traffic control communications—are described in U.S. Pat. No. 8,248,294 by Sampigethaya, et al., which is hereby incorporated by reference in its entirety.

Figure 4:
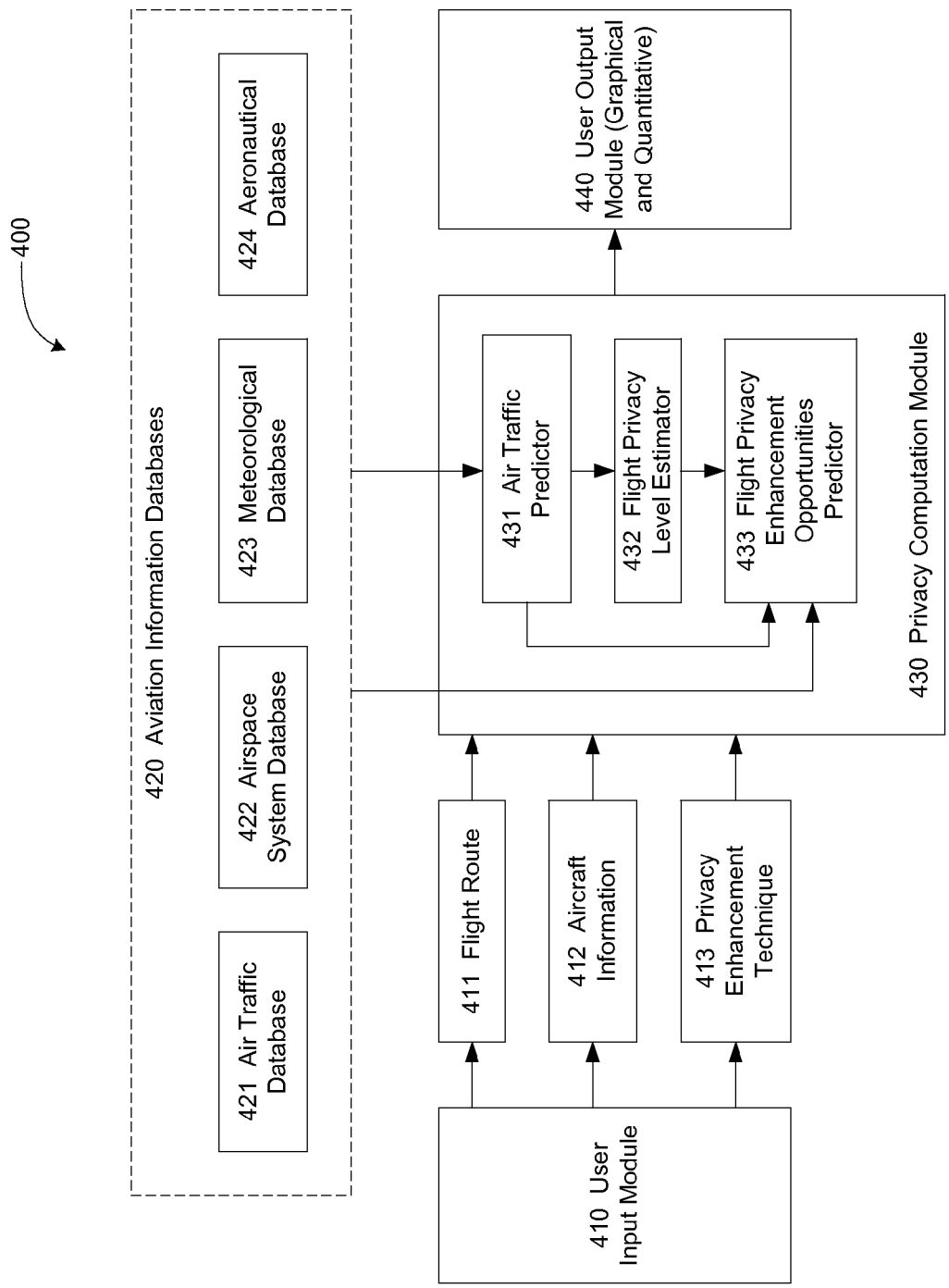
FIG. 4 depicts an example of a system that can be used to predict levels of flight privacy for a given flight plan of an aircraft.

FIG. 4 depicts an example of a system 400 that can be used to predict levels of flight privacy for a given flight plan of an aircraft. The system 400 includes a user input module 410. The user input module 410 can permit a user of the system 400 to input data, test privacy enhancement solutions, pose flight privacy questions, and understand the optimal privacy protections for a given flight. The user input module 410 can be in the form of a personal computer, a tablet computer, a touchscreen display, a control panel on an aircraft, or any other form of device that can accept user inputs.

The user inputs into user input module 410 can include flight route data 411, aircraft information data 412, and an indication of one or more privacy enhancement techniques 413. The flight route data 411 can include an intended flight plan and/or route. The flight route data 411 can be entered graphically, such as by drawing a flight route over a map or other depiction of a geographical area, or entered as text. The flight route data 411 can be entered by a user selecting or entering one or more of waypoints, airways, airports, and random points of flight. The system 400 can create a flight path based on the flight route data 411 entered into the user input module 410.

The aircraft information data 412 can include an indication of the type of aircraft being used. To enter the aircraft information data 412 into user input module 410, the user can select an aircraft model from a list of possible aircraft models, enter aircraft parameters of the aircraft model, and like. Entering aircraft parameters of the aircraft model can include entering an indication of one or more aircraft data links used by the aircraft, such as ADS-B, Mode S, LDACS, and the like. Entering aircraft parameters of the aircraft model can include entering a type of the aircraft, such as a commercial aircraft, a wide-body aircraft, a two-engine aircraft, and the like. Entering aircraft parameters of the aircraft model can also include entering capabilities of the aircraft, such as the aircraft's maximum speed, the aircraft's maximum operating altitude, and the like.

The indication of one or more privacy enhancement techniques 413 can represent the privacy enhancement technique(s) that the user wants the system 400 to take into account when predicting levels of flight privacy for a given flight plan of the aircraft. The user can select one or more privacy enhancement techniques from a list of defined privacy enhancement techniques, the user can define one or more privacy enhancement techniques, and the user can indicate the one or more privacy enhancement techniques in any other manner. As discussed above, privacy enhancement techniques can include updating an identifier of the aircraft, using a random silent period technique, using a mix airspace technique, using a group travel technique, and any other privacy enhancement technique. A user can enter one privacy enhancement technique for the system 400 to consider, two or more privacy enhancement techniques for the system 400 to consider independently, or two or more privacy enhancement techniques for the system 400 to consider in combination.

Depicted in FIG. 4 are also aviation information databases 420. The line around aviation information databases 420 is dashed to indicate that one or more of the aviation information databases 420 may be external to the system 400, such as via a network (e.g., the internet). While the aviation information databases 420 may be external to the system 400, one or more of the aviation information databases 420 may also be a part of the system 400. The aviation information databases 420 can include information accessible to the system 400. The aviation information databases 420 may also be available to other entities, such as air traffic control, airline operations centers, to aviation enthusiasts, or to the general public.

The aviation information databases 420 can include an air traffic database 421. The air traffic database 421 can include information about air traffic, such as filed flight plans, air traffic statistics of airports, VFR traffic statistics for airspaces, unmanned aerial vehicle ("UAV") traffic statistics, and the like. The aviation information databases 420 can also include an airspace system database 422 that includes information about one or more airspaces. For example, the airspace system database 422 can include information about airway configurations, information about airspace configurations, information about mandated aircraft data links for a given airspace, information about privacy protection capabilities (e.g., assigned mix airspaces), and information about airspace limitations (e.g., that anonymous or radio silent modes are not permitted in a given airspace). The aviation information databases 420 can also include a meteorological database 423. The meteorological database 423 can include meteorological information that may affect airspaces, airports, and airways, such as weather forecasts for airspaces, airports, and airways, flight/airport delay delays statics due to bad weather, and the like. The aviation information databases 420 can also include an aeronautical database 424. The aeronautical database 424 can include information about special uses of airspaces, temporary flight restrictions in certain airspaces, information about aeronautical emergencies, and the like.

The system 400 also includes a privacy computation module 430 that is configured to predict levels of flight privacy for a given flight plan of an aircraft and to predict possible privacy enhancing opportunities. The privacy computation module 430 can receive indications of user inputs from user input module 410, such as one or more of flight route data 411, aircraft information data 412, and an indication of one or more privacy enhancement techniques 413. The privacy computation module 430 can also receive information from one or more of the aviation information databases 420. The indications of user inputs from user input module 410 and the information from one or more of the aviation information databases 420 can be used to predict levels of flight privacy for a given flight plan of an aircraft and to predict possible privacy enhancing opportunities.

The privacy computation module 430 includes an air traffic predictor 431. Based on the flight route data 411 and information from one or more of the aviation information databases 420, the air traffic predictor 431 can estimate an air traffic density for one or more airspaces along or near the planned flight route and for one or more periods of time. The estimated air traffic density at a particular time and in a particular airspace can include one or more of the expected total air traffic density, the expected IFR-only air traffic density, the expected VFR-only air traffic density, the expected private-aviation-only air traffic density, the expected UAV-only air traffic density, and the like. The air traffic predictor 431 can estimate the air traffic density based on air traffic patterns, such as one or more of velocities, flight levels, and flight phases of air traffic predicted to be in a given airspace. Information about such air traffic patterns (e.g., velocities, flight levels, flight phases of air traffic) can be obtained from one or more of the aviation information databases 420, such as the air traffic database 421.

Figure 5:
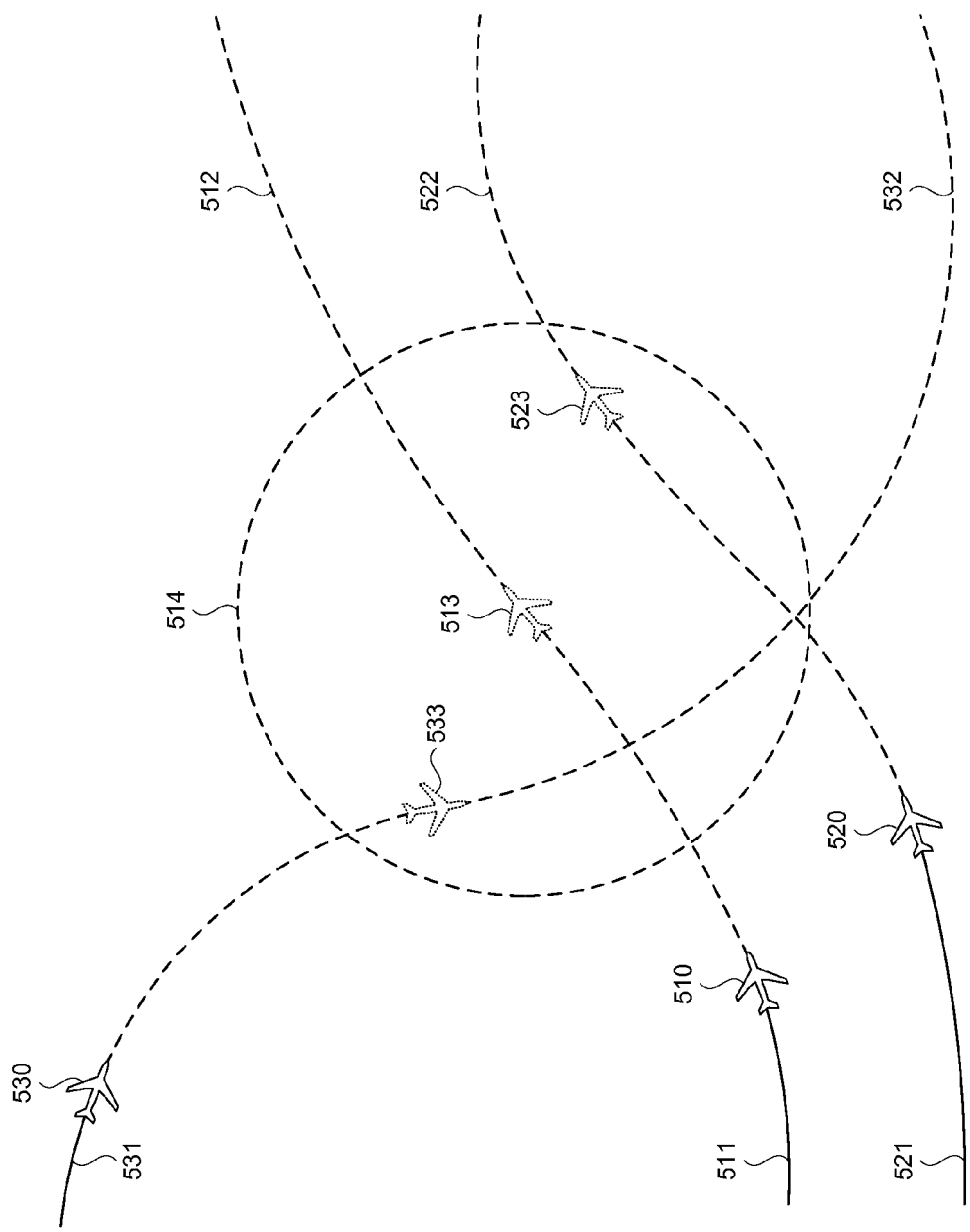
FIG. 5 depicts an example of estimating an air traffic density at a future time.

An example of an estimated air traffic density is shown in FIG. 5. FIG. 5 depicts a first aircraft 510, a second aircraft 520, and a third aircraft 530. At their positions depicted in FIG. 5, the first aircraft 510 has travelled along flight path 511, the second aircraft 520 has travelled along flight path 521, and the third aircraft 530 has travelled along flight path 531. The first aircraft 510 has a planned flight path 512. The air traffic predictor 431 can receive an indication of the planned flight path 512 from user input module 410. FIG. 5 also depicts an expected future location 513 of the first aircraft 510, and an airspace 514 around the expected future location 513 of the first aircraft 510.

The second aircraft 520 has a planned flight path 522. The air traffic predictor 431 can receive an indication of the current location of the second aircraft 520 and the planned flight path 522 from one or more of the aviation information databases 420. The air traffic predictor 431 can also receive an indication of the velocity of the second aircraft 520 from one or more of the aviation information databases 420. The air traffic predictor 431 can predict a future location 523 of the second aircraft 520 based on at least the planned flight path 522 and the velocity of the second aircraft 520. The third aircraft 530 has a planned flight path 532. The air traffic predictor 431 can receive an indication of the current location of the third aircraft 530 and the planned flight path 532 from one or more of the aviation information databases 420. The air traffic predictor 431 can also receive an indication of the velocity of the third aircraft 530 from one or more of the aviation information databases 420. The air traffic predictor 431 can predict a future location 533 of the third aircraft 530 based on at least the planned flight path 532 and the velocity of the third aircraft 530.

The air traffic predictor 431 can estimate the air traffic density within the airspace 514 surrounding the expected future location 513 of the first aircraft 510. In this particular depiction, two other aircraft—the second aircraft 520 and the third aircraft 530—are expected to be in the airspace 514 surrounding the expected future location 513 of the first aircraft 510. However, many other possible estimated air traffic densities are possible.

While FIG. 5 depicts one instance of an estimated air traffic density, the air traffic predictor 431 can estimate air traffic densities for any number of possible airspaces along the planned flight path 512 of the first aircraft 510. For example, the air traffic predictor 431 can estimate air traffic densities for airspaces located at particular intervals from the current position of the first aircraft 510 to the intended destination of the first aircraft 510. Moreover, the air traffic predictor 431 can predict air traffic densities of possible future locations of the first aircraft 510 that are near to the planned flight path 512. For example, the air traffic predictor 431 can predict air traffic densities of a future position of the first aircraft 510 if the first aircraft 510 deviated from its course by some acceptable distance. In another example, the air traffic predictor 431 can predict air traffic densities of a future position of the first aircraft 510 if the first aircraft 510 accelerated from its intended velocity to a higher velocity. Many other possible future locations of the first aircraft 510 that are near to the planned flight path 512 are possible.

Figure 6:
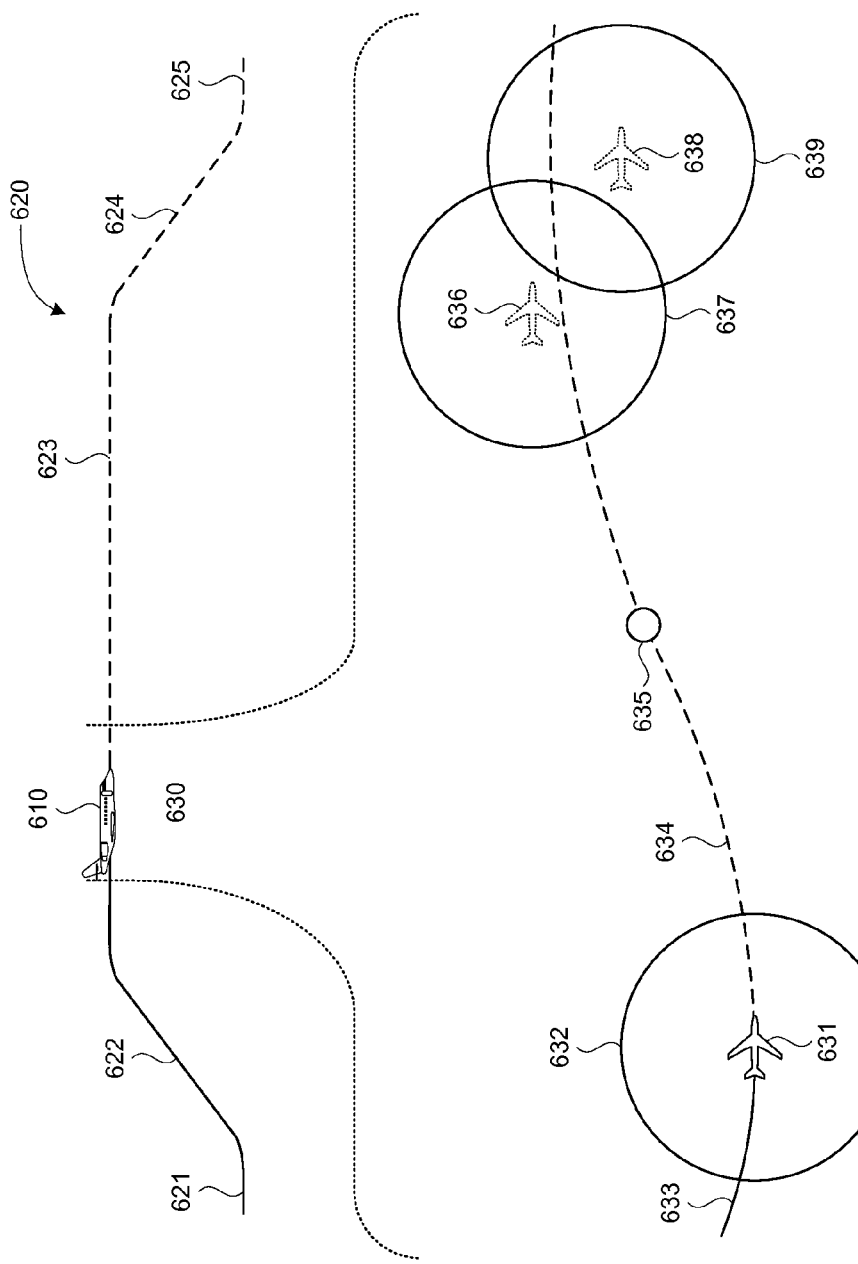
FIG. 6 depicts an example of estimating air traffic densities that are near to a flight path.

FIG. 6 depicts an example of estimating air traffic densities that are near to a flight path. The upper portion of FIG. 6 depicts a side view an aircraft 610 travelling long a flight path 620. The flight path 620 includes a number of stages, such as a taxi and takeoff stage 621, an ascent stage 622, an en route stage 623, a decent stage 624, and a landing and taxi stage 625. The solid portion of the flight path 620 (to the left of the aircraft 610) indicates a portion of the flight path 620 that the aircraft 610 has already travelled, and the dashed portion of the flight path 620 (to the right of the aircraft 610) indicates a portion of the flight path 620 that the aircraft 610 has planned to travel. FIG. 6 also includes dotted lines marking a portion 630 of the flight path 620. The lower portion of FIG. 6 depicts an overhead view of the marked portion 630 of the flight path 620.

The lower portion of FIG. 6 depicts a current location 631 of the aircraft 610 and an airspace 632 surrounding the current location 631 of the aircraft 610. The airspace 632 can represent the distance that the aircraft 610 can communicate when it is located at the current location 631. The lower portion of FIG. 6 also depicts a solid line indicating a portion 633 of the flight path 620 that the aircraft 610 has already travelled and a dashed line indicating a portion 634 of the flight path 620 that the aircraft 610 has planned to travel. The portion 634 of the flight path 620 that the aircraft 610 has planned to travel passes through a waypoint 635. The portions of the flight path 620 between the current location 631 of the aircraft 610 and the waypoint 635 may be modifiable to a certain extent (as permitted by an authorized entity, such as the FAA), and the portions of the flight path 620 to the right of the waypoint 635 may be also be modifiable to a certain extent (as permitted by an authorized entity, such as the FAA). However, the aircraft 610 may be required to pass through waypoint 635 as part of the flight.

FIG. 6 also depicts a first possible future location 636 of aircraft 610. The first possible future location 636 of aircraft 610 is near the portion 634 of the flight path 620 that the aircraft 610 has planned to travel. Around the first possible future location 636 of aircraft 610 is an indication of an airspace 637. The airspace 637 can represent the distance that the aircraft 610 can communicate when it is located at the first possible future location 636. FIG. 6 also depicts a second possible future location 638 of aircraft 610. The second possible future location 638 of aircraft 610 is near the portion 634 of the flight path 620 that the aircraft 610 has planned to travel. Around the second possible future location 638 of aircraft 610 is an indication of an airspace 639. The airspace 639 can represent the distance that the aircraft 610 can communicate when it is located at the second possible future location 638.

Even though the first possible future location 636 and the second possible future location 638 are not on the portion 634 of the flight path 620 that the aircraft 610 has planned to travel, the first possible future location 636 and the second possible future location 638 may be locations which would be permissible deviations from the portion 634 of the flight path 620 that the aircraft 610 has planned to travel. The air traffic predictor 431 can estimate an air traffic density for the airspaces 637 and 639 along or near the planned flight route and for one or more periods of time. For example, the air traffic predictor 431 can determine whether one or more other aircraft are expected to be within the airspaces 637 and 639 at a time that the aircraft 610 may be located at either the first possible future location 636 or the second possible future location 638. The air traffic predictor 431 can estimate an air traffic density for the airspaces 637 and 639 based on the determination whether one or more other aircraft are expected to be within the airspaces 637 and 639. The air traffic predictor 431 can also estimate an air traffic density for any number of other airspaces along or near the planned flight path 620 to the right of aircraft 610.

Referring back to FIG. 4, the privacy computation module 430 also includes a flight privacy level estimator 432. The flight privacy level estimator 432 receives the estimated air traffic density output from the air traffic predictor 431, and estimates a flight privacy level for the one or more airspaces for which an estimated air traffic density has been provided by the air traffic predictor 431. The estimated flight privacy level can include a number of anonymity sets for the given flight route. Each of the anonymity sets can be based on particular portions of the flight route, expected air traffic density along the fight route, and the like. The estimated flight privacy level can also include a probability distribution for the anonymity sets. The probability distribution can include a probability that the expected air traffic density in the anonymity set will permit performance of the one or more privacy enhancement techniques 413. The estimated flight privacy level can also include a size for the anonymity sets and an entropy range for the probability distributions of the anonymity sets. The estimated privacy level can be measured by the anonymity set size and entropy of the anonymity set probability distribution. In one example of estimating a probability distribution, a default probability distribution can be modified based on the air traffic patterns output from the air traffic predictor. The modified probability distribution modified based on air traffic patterns or density of an anonymity set can be the estimated probability distribution for that anonymity set.

The privacy computation module 430 also includes a flight privacy enhancement opportunity predictor 433. For a given flight route, one or more airspaces, and one or more particular times, the flight privacy enhancement opportunity predictor 433 can predict an expected privacy in each of the one or more airspaces. The flight privacy enhancement opportunity predictor 433 can predict maximum and minimum privacy bounds for one or more segments of the flight route and/or for the entire flight route. The maximum and minimum privacy bounds can be based on an ability and/or an inability to employ one or more privacy enhancement techniques. The flight privacy enhancement opportunity predictor 433 can predict a flight time and one or more future positions during which privacy can be increased. For example, referring to FIG. 6, the flight privacy enhancement opportunity predictor 433 can predict that the first possible future location 636 and the second possible future location 638 are locations where a privacy enhancement technique can be successfully employed. The flight privacy enhancement opportunity predictor 433 can predict a likelihood of achieving a particular privacy level during a flight. To make each of these predictions, the flight privacy enhancement opportunity predictor 433 can use one or more of information obtained from the one or more aviation information databases 420, information provided by the air traffic predictor 431, information provided by the flight privacy level estimator 432, and information from the user input module, such as the flight route data 411, the aircraft information 412, and/or the one or more privacy enhancement techniques 413. Estimating an achievable level of privacy can include estimating a number of flight privacy enhancement opportunities, estimating a level of entropy achievable during a flight route, determining a probability distribution for anonymity sets along the flight route, and the like.

The system 400 can also include a user output module 440. The user output module 440 can provide information developed by the privacy computation module 430. For example, the user output module 440 can provide one or more of an indication of an output of the air traffic predictor 431, an output of the flight privacy level estimator 432, and an output of the flight privacy enhancement opportunity predictor 433. The user output module 440 and the user input module 410 can be included in the same device, such as a desktop computer, a laptop computer, and the like. The user output module 440 can provide information in a text format or a graphical format. For example, the user output module 440 can display a planned flight route overlayed on a depiction of a geographical area (such as a map). The user output module 440 could also overlay, on the depiction of a geographical area, one or more future positions during which privacy can be increased that were predicted by the flight privacy enhancement opportunity predictor 433.

Figure 7:
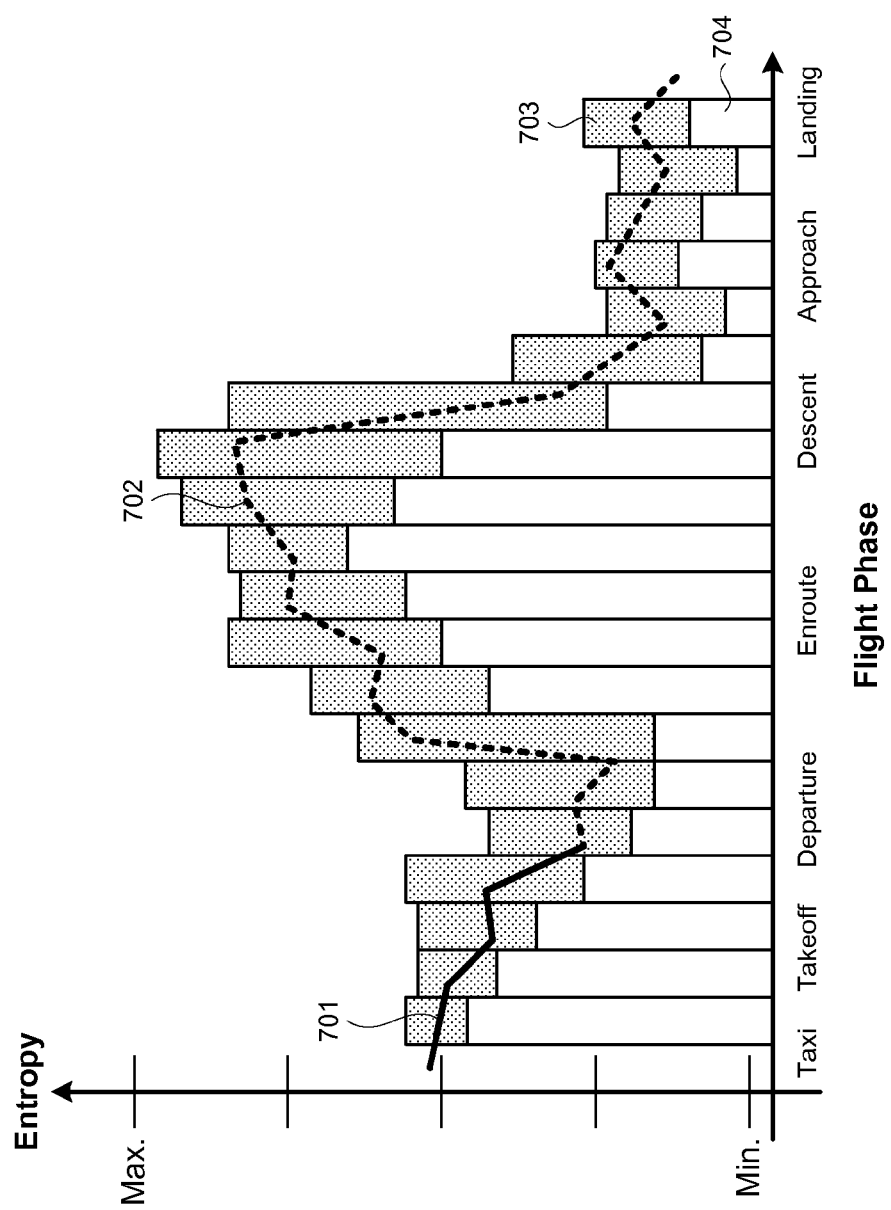
FIG. 7 depicts an example of a chart that can be output by a user output module.

FIG. 7 depicts a chart that is one example of a graphical output of the user output module 440. The chart in FIG. 7 depicts entropy as a function of flight time. The maximum entropy can be a level of entropy based on an expected maximum level of privacy enhancing opportunities. The expected maximum level of privacy enhancing opportunities can be based on many factors, including current weather conditions, predicted weather conditions, the location of other flights, the speed and heading of other flights, and the like. The minimum entropy can be a level of entropy based on an expected minimum level of privacy enhancing opportunities. The expected minimum level of privacy enhancing opportunities can be based on the same type of factors as the maximum level of privacy enhancing opportunities. The chart includes a solid line 701 indicating the entropy level of a completed portion of a flight route and a dashed line 702 indicating an uncompleted portion of a planned flight route. The chart also includes a series of pairs of bars 703 and 704. The bars 703 indicate a maximum expected level of entropy for a particular segment of a flight. The bars 704 indicate a minimum expected level of entropy for a particular segment of a flight. The difference between one of bars 703 and a corresponding one of bars 704 indicates a range of possible levels of entropy during a segment of the flight. Such a chart could be displayed to a user by the user output module 440 to indicate various levels of entropy as a function of flight time.

The system 400 depicted in FIG. 4 can be used in a variety of settings. The system 400 can be included in an aircraft. In this case, the system 400 can be used by a pilot and/or flight engineer. When the system 400 in included in an aircraft, it may be beneficial to pre-load the aircraft with possible updated identifiers before the first aircraft takes off. In this manner, the user on an aircraft may be able to determine possible locations for privacy enhancement using the system 400 on the aircraft and take advantage of one or more privacy enhancement techniques using the pre-loaded identifiers without having to communicate with any ground station. The system 400 can also be used by a ground-based station, such as a ground-based station of a company that operates an aircraft or a ground-based flight service station that provides information and services to aircraft before, during, and after flights. An operator in the ground-based station may be able to send any of the outputs from the system 400 to an aircraft either before flight or during flight. When an indication is transmitted from the ground-based station to the aircraft about a position during which privacy can be increased, a possible updated identifier for the aircraft can also be transmitted from the ground-based station to the aircraft.

Some potential benefits of the use of system 400 include an ability to predict privacy levels achievable in a given flight plan or route, an ability to assess flight privacy enhancement techniques that can be used by the aircraft, and an ability to add a privacy layer to flight planning and optimization problems. Taking advantage of these benefits can protect against flight privacy loss due to flight tracking based on all types of aircraft data links. The types of aircraft that can benefit from protection against flight privacy loss can include business jets, military aircraft, space-bound aircraft, other non-commercial aircraft, and the like. Business jets may carry passengers that may not want the general public to track their aircraft, such as celebrities, widely-known business executives, and the like. Operators of military aircraft may not want the public to be able to track movements of the aircraft. This concern may especially be the case when military aircraft are located in foreign air spaces to prevent potential enemies from tracking and possibly firing on military aircraft. Operators of space-bound aircraft, such as government- or commercially-operated rockets or space planes, may also benefit from reducing the ability of the public to track the flights leaving the earth for space.

Figure 8:
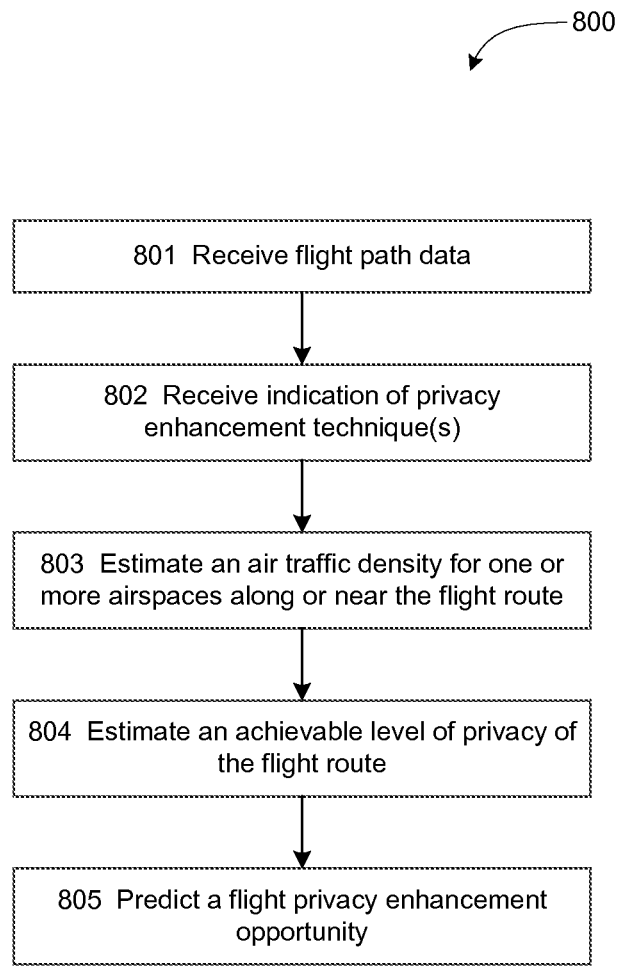
FIG. 8 depicts an example of a method of predicting a flight privacy enhancement opportunity.

FIG. 8 depicts an example of a method 800 of predicting a flight privacy enhancement opportunity. At block 801, flight path data for a particular flight can be received. The flight path data can be received by a computing system, such as a privacy computation module. At block 802, an indication of one or more privacy enhancement techniques can be received. The one or more privacy enhancement techniques can be received by the computing system. At block 803, an air traffic density can be estimated for one or more airspaces along or near the flight route. Estimating an air traffic density can be based on information obtained from one or more aviation information databases. The air traffic density can be estimated by the computing system. At block 804, an achievable level of privacy can be estimated for the flight route. Estimating the achievable level of privacy can be based on the air traffic density for one or more airspaces. The achievable level of privacy can be estimated by the computing system. At block 805, a flight privacy enhancement opportunity can be predicted. Predicting the flight privacy enhancement opportunity can be based on the air traffic density, the achievable level of privacy of the flight route, and the one or more privacy enhancement techniques. The flight privacy enhancement opportunity can be predicted by the computing system.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed is:

1. A method of predicting an achievable level of privacy of a flight path, the method comprising:
    receiving, by a computer comprising a processor and memory, an indication of a flight route of an aircraft;
    receiving, by the computer, an indication of one or more privacy enhancement techniques;
    estimating, by the computer, an air traffic density for one or more airspaces along or near the flight route, the estimating based on information obtained from one or more aviation information databases;
    estimating, by the computer, an achievable level of privacy of the flight path based, at least in part, on the air traffic density for one or more airspaces and the one or more privacy enhancement techniques; and
    outputting, to a display communicatively coupled to the computer, an indication of the estimated achievable level of privacy.

2. The method of claim 1, further comprising:
    using the estimated achievable level of privacy of the flight path as a privacy layer in one or more flight planning and optimization problems.

3. The method of claim 1, further comprising:
    receiving an indication of aircraft information of the aircraft, wherein estimating the achievable level of privacy of the flight path is further based, at least in part, on the aircraft information.

4. The method of claim 1, wherein estimating the achievable level of privacy of the flight path is further based, at least in part, on at least a portion of the information obtained from the one or more aviation information databases.

5. The method of claim 1, wherein the information obtained from the one or more aviation information databases comprises air traffic information from an air traffic database.

6. The method of claim 1, wherein the information obtained from the one or more aviation information databases comprises airspace system information from an airspace system database.

7. The method of claim 1, wherein the one or more privacy enhancement techniques comprises a technique that includes updating an identifier of the aircraft.

8. The method of claim 7, wherein the technique further includes at least one of an identifier update, a random silent period, using a mix airspace, or a group update.

9. A system of predicting an achievable level of privacy of a flight path, the system comprising:
    a user input module configured to receive an indication of a flight route of an aircraft and an indication of one or more privacy enhancement techniques;
    a privacy computation module configured to:
        estimate, based on information obtained from one or more aviation information databases, an air traffic density for one or more airspaces along or near the flight route, and
        estimate an achievable level of privacy of the flight path based, at least in part, on the air traffic density for one or more airspaces and the one or more privacy enhancement techniques; and
    a user output module configured to output an indication of the estimated achievable level of privacy.

10. The system of claim 9, wherein the privacy computation module is configured to communicate with the one or more aviation information databases via a network.

11. The system of claim 9, wherein the system is located on the aircraft.

12. The system of claim 11, wherein the aircraft comprises one or more pre-loaded updated identifiers.

13. The system of claim 9, wherein the system is located in a ground-based station.

14. The system of claim 13, wherein the ground-based station is configured to transmit an output of the user output module to the aircraft.

15. The system of claim 14, wherein the ground-based station is configured to transmit an updated aircraft identifier to the aircraft with the output of the user output module.

16. A method of predicting a flight privacy enhancement opportunity, the method comprising:
   receiving, by a computer comprising a processor and memory, an indication of a flight route of an aircraft;
   receiving, by the computer, an indication of one or more privacy enhancement techniques;
   estimating, by the computer, an air traffic density for one or more airspaces along or near the flight route, the estimating based on information obtained from one or more aviation information databases;
   estimating, by the computer, an achievable level of privacy of the flight route based, at least in part, on the air traffic density for one or more airspaces;
   predicting, by the computer, a flight privacy enhancement opportunity based, at least in part, on the air traffic density, the estimated achievable level of privacy of the flight route, and the one or more privacy enhancement techniques; and
   displaying, on a display communicatively coupled to the computer, an indication of the estimated achievable level of privacy.

17. The method of claim 16, wherein the flight privacy enhancement opportunity is located in one of the one or more airspaces.

18. The method of claim 17, wherein the one or more privacy enhancement techniques comprise a technique that includes updating an identifier of the aircraft in the one of the one or more airspaces.

19. The method of claim 16, wherein predicting the flight privacy enhancement opportunity comprises predicting a plurality of flight privacy enhancement opportunities located along or near the flight route.

20. The method of claim 16, further comprising:
   displaying the flight route overlayed on a representation of a geographical area; and
   displaying the flight privacy enhancement opportunity overlayed on the representation of the geographical area.

* * * * *